UNITED STATES PATENT OFFICE.

MAX FESSLER, OF PFORZHEIM, GERMANY.

PROCESS FOR SOLDERING CHAIN-LINKS.

No. 890,896.　　　　　Specification of Letters Patent.　　　Patented June 16, 1908.

Original application filed July 11, 1907, Serial No. 383,361. Divided and this application filed December 19, 1907.
Serial No. 407,199.

*To all whom it may concern:*

Be it known that I, MAX FESSLER, a subject of the German Emperor, and residing at Pforzheim, Germany, have invented certain new and useful Improvements in Processes for Soldering Chain-Links, of which the following is a specification.

This application is a division of an application for patent filed by me July 11, 1907;
Serial No. 383,361.

The present invention relates to the manufacture of chains, and more especially of ornamental chains of all kinds from wire provided with a core of solder, and the invention has reference in particular to a process of continuously shutting the joints of the links of such chains.

According to one well known process of manufacturing chains of this description, the cored wire links to be separately soldered are wetted with a soldering fluid (deoxydizing agent) and are then united by being heated to the melting point of the solder by passage through the flame of a Bunsen burner or the like. The great drawback of this method is that adjacent links frequently become soldered together owing to the solder oozing out and overflowing. There is another process, which, however, can only be used with real advantage in the case of relatively large objects, such as parts of machines or bicycles. With this process the articles are first immersed in a soldering fluid, and the crystals of soldering salt which remain after evaporation of the solvent then removed. Hereupon a protective coating is applied to the places which are not soldered (the joint itself being left exposed) and the article then dipped into liquid solder. This method, however, is not practicable for cored wire chains, whose links must be shut separately. For owing to the smallness of the links and for other reasons, it would be extremely difficult to keep the joint free from the protective coating, and to dip the links into the liquid solder; and the process would be unfavorable to the links and would render the entire procedure of manufacture much more expensive than hitherto.

In proceeding according to my new process the links are first submitted to a number of preparatory operations; no attention has to be paid to the joint, since owing to the use of cored wire the solder is always at the right place. Thereupon, to avoid adjacent links getting soldered together, all of the links, including the joints, prior to being heated are coated with a protective mass, whereby continuous, simple mechanical, wholesale soldering of the links is made possible. For this purpose a piece of chain of solder-cored wire links, of any desired length, is drawn through a deoxidizing agent, to prevent oxidation of the metal during the soldering operation. It is then moved to and fro over, or passed above, the flame of a burner, until the solvent is evaporated. The links now present a layer of dry soldering salt crystals. Since, however, to obtain a clean soldered joint without dirtying the link, only the actual joint faces have to be provided with the soldering agent, the soldering salt crystals, with the exception of those at the joint, must be removed. For this purpose the links by mutual rubbing and scouring are mechanically cleansed of the crust of salt, so that the soldering agent remains at the joint alone, which is not affected by this treatment.

In order to prevent the links from becoming united, or soldered to each other, by the solder which oozes out or overflows, the surface of the links now cleansed from the soldering agent is coated with a protective mass, the entire chain, before heating being passed through a mass which tends to obstruct soldering, no special precaution being taken respecting the joints. It is then only necessary for the chain to be passed through the flame of a burner or soldering furnace, or in the case of large strong links through a blowpipe flame, whereby the links are heated to such temperature that the solder within melts and in well-known manner unites the ends to be shut.

What I claim is:—

The process of continuously shutting the joints of the links of a chain of solder-cored wire, consisting in wetting the links with a soldering fluid, evaporating the adhering moisture, removing the soldering salt crystals from the parts other than the faces of the joints, passing the chain through a protective mass, and heating the chain until the core melts and shuts the joints, substantially as described.

In testimony whereof I affix my signature in presence of two witnesses.

MAX FESSLER.

Witnesses:
FRANZ ANTON HUBLOCH,
CARL W. SCHMITT.